(12) United States Patent
Bickham et al.

(10) Patent No.: US 10,168,246 B2
(45) Date of Patent: Jan. 1, 2019

(54) METHODS OF SELECTING OPTICAL FIBERS THAT MEET BANDWIDTH REQUIREMENTS AT DIFFERENT WAVELENGTHS

(71) Applicant: Corning Incorporated, Corning, NY (US)

(72) Inventors: Scott Robertson Bickham, Corning, NY (US); Dana Craig Bookbinder, Corning, NY (US); Xin Chen, Corning, NY (US); Steven Craig Garner, Jr., Corning, NY (US); Ming-Jun Li, Horseheads, NY (US); Dale Robert Powers, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 52 days.

(21) Appl. No.: 15/298,385

(22) Filed: Oct. 20, 2016

(65) Prior Publication Data
US 2017/0146428 A1    May 25, 2017

Related U.S. Application Data (60) Provisional application No. 62/259,247, filed on Nov. 24, 2015.

(51) Int. Cl.
*G01J 5/00* (2006.01)
*G01M 11/00* (2006.01)
(Continued)

(52) U.S. Cl.
CPC ............ *G01M 11/30* (2013.01); *G01J 7/00* (2013.01); *G02B 6/02214* (2013.01); *H04B 10/27* (2013.01)

(58) Field of Classification Search
CPC .................................................. G01M 11/3172
See application file for complete search history.

(56) References Cited

U.S. PATENT DOCUMENTS

2013/0155391 A1*  6/2013  Achten ............... G01M 11/31
                                                        356/73.1
2014/0318188 A1  10/2014  Bowker
2014/0319354 A1  10/2014  Chen et al.

FOREIGN PATENT DOCUMENTS

EP         1705471 A1 *  9/2006  ........ G01M 11/3172

OTHER PUBLICATIONS

Ahn et al., "New optical frequency domain differential mode delay measurement method for a multimode optical fiber," 2005, Optics Express, vol. 13, No. 11, pp. 4005-4011.*

(Continued)

*Primary Examiner* — Kiho Kim
(74) *Attorney, Agent, or Firm* — Robert L. Carlson (57) ABSTRACT

Methods of selecting, from a set of like optical fibers, a subset of optical fibers that can meet both short-wavelength and target-wavelength bandwidth requirements are disclosed. The method includes obtaining short-wavelength bandwidth data from DMD measurements, and determining a peak wavelength for each optical fiber. A target-wavelength bandwidth is then calculated using the determined peak wavelengths. The calculated target bandwidth is then compared to the short-wavelength and target-wavelength bandwidth requirements to identify which of the optical fibers satisfy these requirements.

24 Claims, 8 Drawing Sheets

(51) Int. Cl.
    *H04B 10/27*     (2013.01)
    *G01J 7/00*     (2006.01)
    *G02B 6/02*     (2006.01)

(56) References Cited

OTHER PUBLICATIONS

Ahn et al., "High-resolution differential mode delay measurement for a multimode optical fiber using a modified optical frequency domain reflectometer," 2005, Optics Express, vol. 13, No. 20, pp. 8256-8262.*

Giaretta et al., "High-speed (11 Gbit/s) data transmission using pefluoreinated graded-index polymer optical fibers for short interconnects (<100m)," 2000, IEEE Photonics technology letters, vol. 12, No. 3, pp. 347-349.*

Denis Molin et al, "WideBand OM4 Multi-Mode Fiber for Next-Generation 400Gbps Data Communications", ECOC, Sep. 2014, Cannes—France, p. 1.6.

Tomofumi Kise et al., "Development of 1060nm 25-Gb/s VCSEL and Demonstration of 300m and 500m System Reach using MMFs and Link optimized for 1060 nm", published at OFC, San Francisco, California, Mar. 2014, paper Th4G.3, https://doi.org/10.1364/OFC.2014.Th4G.3, downloaded Oct. 19, 2016.

Adrian Amezcua, Denis Molin, (Prysmian Group), Paul Kolesar, Rich Baca (CommScope), "Wide Band MMF bandwidth requirements", TR-42.11 wide Band MMF project proposal, 15 PGS. Oct. 2014.

Paul Kolesar, (OFS) Rich Baca, Roman Shubochkin, Dave Mazzarese, (CommScope) Jonathan King, Jim Tatum, (Finisar), "Wide Band MMF", TR42.11, TR-42.12, 19 PGS. Oct. 2014.

\* cited by examiner

METHODS OF SELECTING OPTICAL FIBERS THAT MEET BANDWIDTH REQUIREMENTS AT DIFFERENT WAVELENGTHS

This application claims the benefit of priority under 35 U.S.C. § 119 of U.S. Provisional Application Ser. No. 62/259,247 filed on Nov. 24, 2015 the content of which is relied upon and incorporated herein by reference in its entirety.

FIELD

The present disclosure relates to optical fibers, and in particular to methods of selecting optical fibers from a set of like fibers that meet bandwidth requirements at different wavelengths, e.g., at a short-wavelength and a longer target-wavelength.

The entire disclosure of any publication or patent document mentioned herein is incorporated by reference, including US 2014/0319354 and US 2014/0318188.

BACKGROUND

Multimode fiber (MMF) is the primary optical transmission medium in data centers, and it has enjoyed increased use as the number and size of data centers have expanded. Multimode fibers are classified under certain ISO standards based on the effective modal bandwidth (EMB), which is measured in "frequency×distance" units, e.g., MHz·km. The classifications are referred to using the acronym OM (for "optical multi-mode"), with the present OM standards being OM1, OM2, OM3 and OM4. Each OM-standard fiber has different physical characteristics (e.g., core radius, cladding radius, relative refractive index profile, etc.) that result in different performance characteristics, including different EMBs.

The various design parameters that define an OM-standard fiber are not perfectly reproduced in the manufacturing process. This results in substantial variation in the performance of a given OM-standard fiber, and in particular substantial in the EMB. As a consequence, fiber manufacturers measure select properties of their manufactured OM-standard fibers, such as EMB and OFL-BW. These measurements can also be used to pick the most suitable fibers for a given application for the measured properties at the measurement wavelengths. However, it is more difficult to select the most suitable fibers for use at wavelengths different from the one at which the measurements were made since it is not clear whether a given fiber in a group of supposedly like fibers can actually meet bandwidth requirements at two different wavelengths, such as at 850 nm and at 950 nm.

SUMMARY

An aspect of the disclosure is a method of determining from a set of like optical fibers which of the optical fibers meet a short-wavelength bandwidth requirement $BW_{RS}$ at a short-wavelength $\lambda_S$ and a target-wavelength bandwidth requirement $BW_{RT}$ at a target wavelength $\lambda_T > \lambda_S$. The method includes: a) obtaining a short-wavelength bandwidth $BW_S$ from differential mode delay (DMD) measurement data at the short wavelength $\lambda_S$; b) determining a peak wavelength $\lambda_P$ for each optical fiber; c) calculating a target-wavelength bandwidth $BW_T$ at the target wavelength $\lambda_T$ using the determined peak wavelength; and d) determining which fibers from the set of fibers satisfy the conditions $BW_{RS} \geq BW_S$ and $(0.85)BW_{RT} \geq BW_T$.

Another aspect of the disclosure is a method of selecting from a set of optical fibers a subset of optical fibers that meet a short-wavelength bandwidth requirement $BW_{RS}$ at a short-wavelength $\lambda_S$ and a target-wavelength bandwidth requirement $BW_{RT}$ at a target wavelength $\lambda_T > \lambda_S$. The method includes: a) obtaining a short-wavelength bandwidth $BW_S$ from DMD measurement data at the short wavelength $\lambda_S$; b) determining a peak wavelength $\lambda_P$ for each optical fiber; c) calculating a target-wavelength bandwidth $BW_T$ using the determined peak wavelength; d) identifying a peak wavelength threshold $\lambda_{PT}$ from the determined peak wavelengths of the optical fibers in the set of optical fibers; and e) selecting, from the set of optical fibers, those optical fibers that have a peak wavelength $\lambda_P \geq \lambda_{PT}$ and a short-wavelength bandwidth $BW_S \geq BW_{RS}$.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Terms and Definitions

In the discussion below, the following terms and definition apply.

The symbol "~" as used below means "approximately equal to" or "substantially the same as."

The term "fiber" as used herein is short for "optical fiber." The fibers referred to below are multimode fibers (MMFs) unless otherwise indicated.

The phrase "set of fibers" or "set of like fibers" means a group or collection of fibers that ideally have the same optical properties, such as bandwidth performance, DMD, peak wavelength, loss, etc. at a given wavelength. An example of a set of like fibers is a collection of fibers manufactured to meet a select OM standard, such as OM4.

The modal bandwidth of a MMF is denoted BW and represents the frequency at which the amplitude of the optical output power frequency spectrum drops three decibels (3 dB) relative to the zero frequency component of the fiber. The modal bandwidth is typically measured or calculated in units of (frequency)·(distance) (e.g., MHz·km or GHz·km). The modal bandwidth BW is also referred to below to as just the "bandwidth."

As used herein, the term "differential mode delay" (DMD) of a multi-mode optical fiber is the relative delay measured when a small single-mode pulse having a temporal width in the order of 100 ps and a spatial width of about 5 microns is scanned across the core of a MMF in 1 or 2 micron radial increments. The detailed testing procedure for measuring differential mode delay is defined in TIA-455-220-A: FOTP-220 Differential Mode Delay Measurement of Multimode Fiber in the Time Domain.

A bandwidth metric based on the DMD is the Effective Modal Bandwidth, or EMB, which is calculated using the DMD mask approach. The leading and trailing edges of each pulse are recorded and normalized in power relative to each other, and the overall fiber delay is calculated by subtracting the slowest trailing edge from the fastest leading edge in units of ps/m. To meet a nominal EMB target of 2000 MHz·km or 4700 MHz·km, a fiber must pass the criteria defined by multiple DMD templates, or masks. An alternative and more accurate method for predicting the EMB from the DMD data is called the calculated effective modal bandwidth (EMBc). With this approach, the DMD data is weighted by a set of ten radial functions, and the MinEMBc is the minimum of this set of ten EMBc values.

The short-wavelength bandwidth (e.g., at a short wavelength $\lambda_S$ from 800 nm to 900 nm, such as 850 nm) is denoted $BW_S$ while the target-wavelength bandwidth (e.g., at a target wavelength $\lambda_T$=880 nm to 1310 nm, such as at 914 nm or 950 nm) is denoted $BW_T$, wherein $BW_S<BW_T$. It is assumed that $\lambda_S<\lambda_T$ unless otherwise noted. In an example, $\lambda_S$ and $\lambda_T$ differ by at least 100 nm.

The short-wavelength bandwidth requirement at a short wavelength $\lambda_S$ is denoted $BW_{RS}$ and the target-wavelength bandwidth requirement at the target wavelength $\lambda_T$ is denoted $BW_{RT}$. In the discussion below, the bandwidth requirements are also expressed using EBM, and in an example the modal bandwidth and the EMB are considered to be substantially equal so that the bandwidth requirements for the modal bandwidth and EMB can be considered to be the same or substantially the same.

The term "overfilled launch bandwidth" is denoted OFL-BW.

As used herein, the "peak wavelength" is denoted herein as $\lambda_P$ and means a wavelength of light that maximizes the bandwidth BW of the multi-mode optical fiber. Techniques for measuring the peak wavelength $\lambda_P$ of a multi-mode optical fiber based on multi-wavelength measurement techniques and differential mode delay techniques are known the art and are described, for example, in U.S. 2014/0318188, entitled "Methods for modifying multi-mode optical fiber manufacturing processes," which is incorporated by reference herein. The peak wavelength is also sometimes denoted in the art as "Lp" or "lambda_p."

The peak bandwidth is denoted $BW_P$ is the highest bandwidth a fiber can reach and occurs at $\lambda=\lambda_P$.

MMFs may be produced to have a bandwidth BW exceeding a bandwidth threshold at a peak wavelength $\lambda_P$. In some embodiments, the peak wavelength $\lambda_P$ may be between 780 nm and 1650 nm. In some embodiments, the peak wavelength $\lambda_P$ is 850 nm. In some embodiments, the peak wavelength $\lambda_P$ is 875 nm, 880 nm, 980 nm or 1060 nm. In some embodiments, the peak wavelength $\lambda_P$ is between 1260 nm and 1360 nm, such as between 1300 nm and 1320 nm. However, it should be understood that MMFs may be produced to have any reasonable peak wavelength $\lambda_P$.

The Eq. (1) below is a bandwidth curve-fitting equation that describes the relationship between the bandwidth BW of a MMF and the wavelength λ at which the MMF is used:

$$BW(\lambda) = \frac{0.2}{[a + c(\lambda - \lambda_p)^2]^n} \quad (1)$$

According to Eq. (1), the bandwidth BW has a peak value of $BW_P$=0.2/$a^n$ at $\lambda=\lambda_P$. The parameter c describes the width of the bandwidth versus wavelength curve. The exponent n (not to be confused with refractive index n used elsewhere herein) is also a parameter in Eq. (1) and it affects the shape and width of the modal bandwidth curve. In an ideal case where the refractive index profile is an alpha profile, the exponent n takes the value of 0.5. In practice, the exponent n can take a value between 0.3 and 1.5 depending on the width of the modal bandwidth versus wavelength curve. Thus, the exponent parameter n is treated as an empirical parameter. The Eq. (1) is referred to below as the "bandwidth curve-fitting equation."

It is also possible that, within a given wavelength window, one can have multiple forms of equations that fit measured or calculated bandwidth data reasonable well. However, for MMF, and in particular MMFs made using $GeO_2$ dopant only, the bandwidth BW will always have a peak or maximum value $BW_P$. This feature is determined by the material dispersion property of the fiber. The details of the shape of the bandwidth curve, as well as the peak or maximum bandwidth value and the corresponding peak wavelength, can depend on the refractive index profile, which can vary slightly from one fiber to another.

Multimode Fibers and OM Standards

MMFs are the primary optical transmission medium in data centers, and have enjoyed increased use as the number and size of data centers have expanded. MMFs are classified under certain ISO standards based on bandwidth. The classifications are referred to using the acronym OM (for "optical multi-mode"), with the present OM standards being OM1, OM2, OM3 and OM4. Each OM-standard fiber has different physical characteristics (e.g., core radius, cladding radius, relative refractive index profile, etc.) that result in different performance characteristics, including different bandwidths. Thus, each OM standard defines a set or group of types of fibers.

The OM4 standard is the most recent fiber standard. An OM4 fiber is "laser optimized" to have a minimum EMB of 4700 MHz·km at 850 nm, and a minimum OFL-BW at 850 nm of 3500 MHz·km and a minimum OFL-BW at 1300 nm of 500 MHz·km. The OM4 fibers can be used for 10 Gb/s, 25 Gb/s, 40 Gb/s, and 100 Gb/s data-rate transmission at 850 nm. The OM4 fibers have a core diameter of 50 microns and a specific refractive-index profile or "alpha profile" designed to minimize the DMD at the peak wavelength $\lambda_P$, which in one example is targeted to be 850 nm but can be in the wavelength range from 810 nm to 895 nm The various design parameters that define an OM-standard fiber are not perfectly reproduced in the fiber manufacturing process. This results in substantial variation in the performance of fibers for a given OM-standard, and in particular substantial variations in the bandwidth performance. As a consequence, fiber manufacturers measure select properties of their manufactured OM-standard fibers, such as BW, OFL-BW and EMB, to ensure that the fibers meet the requirements for the given OM standard. Note that the fibers do not need to have the exact values for the various defined performance parameters of the given OM standard; they just need to meet or exceed the values for the defined performance parameters. In addition, as discussed below, one can extract more information from the DMD measurement such as $BW_P$ and the peak wavelength, $\lambda_P$. These performance parameter measurements can be used to select the most suitable fibers for a given application. Thus, a given set or group of supposedly like fibers, e.g., a collection of fibers of a given OM-standard, can have substantial variations in performance between fibers.

While OM-standard fibers are designed for optimum performance at a select operating wavelength such as 850 nm, they can be used at other wavelengths besides this wavelength. Note that the operating wavelength of 850 nm need not be the peak wavelength. For example, while OM4 fibers have their performance specified at 850 nm, some vertical-cavity surface-emitting lasers (VCSELs) emit light at other wavelengths, e.g., 918 nm. Other wavelengths of interest include 950 nm, 980 nm, 1060 nm and 1200 nm. However, there is no specification of the bandwidth BW for OM-standard fibers for these and other wavelengths. Also, the bandwidth measurements made during production are typically DMDs measured at or around 850 nm, which yield EMB and/or MinEMBc values at 850 nm in addition to the OFL-BWs at 850 nm. OFL-BW can also be measured at 1300 nm.

One can directly measure the bandwidth BW and other performance properties of OM-standard fibers at wavelengths different from the 850 nm and 1300 nm wavelengths used to characterize the fibers during manufacturing. However, this would represent an immensely labor-intensive and expensive effort given the large numbers of possible OM-standard fibers involved and the different wavelengths that might be used.

It would therefore be much more efficient to be able to leverage the existing performance/measurement data during manufacturing to assess the bandwidth performance of an OM-standard fiber (or other class of fiber) at different (and in particular, a longer) wavelength than at which it was originally measured. For example, if one could select the fibers that meet a bandwidth requirement at a long wavelength as a preliminary screening process, it would save a great deal of time, effort and expense.

Variations in the Peak Wavelength and Peak Bandwidth

Figure 1:
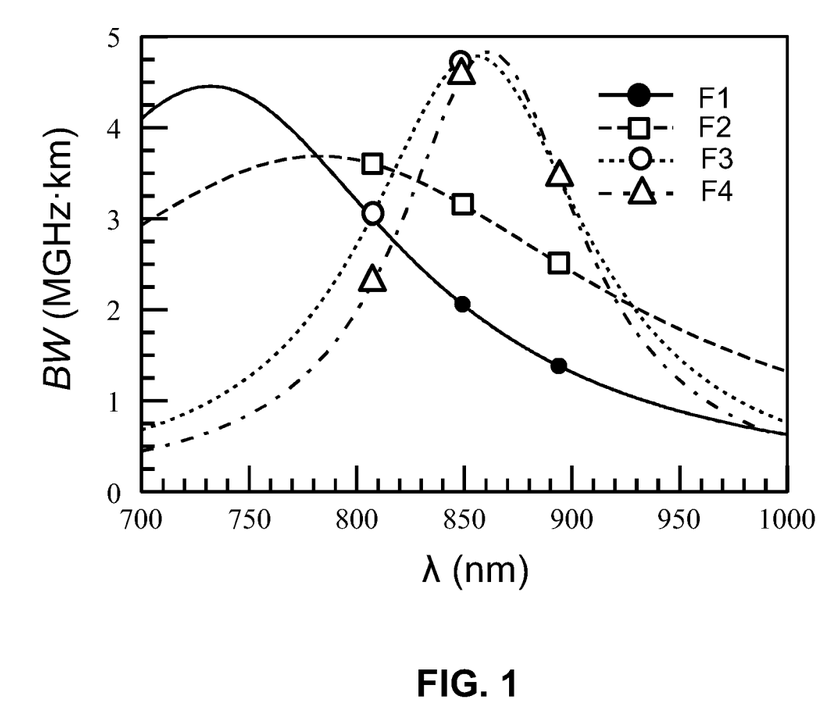
FIG. 1 is a plot of the measured modal bandwidth (GHz·km) vs. wavelength λ (nm) showing data for four fibers F1 through F4 and showing the fitted curves for each fiber based on the bandwidth curve-fitting equation as introduced and discussed below.

FIG. 1 is a plot of the measured modal bandwidth BW (GHz·km) vs. wavelength $\lambda$ (nm) showing data for four fibers F1 through F4, and showing the fitted curves for each fiber based on the bandwidth curve-fitting Eq. (1), above. For each of the fitted curves, the exponent n in Eq. (1) was set to n=1. The plot of FIG. 1 illustrates how the bandwidth curves can vary from one fiber to another. In particular, different fibers can have different peak bandwidth values $BW_P$ and different peak wavelengths $\lambda_P$.

If the peak bandwidth $BW_P$ is high relative to a required or reference bandwidth value $BW_R$ (e.g., an OM-standard bandwidth), it may correspond to a suitably high target-wavelength bandwidth $BW_T$ at a target wavelength $\lambda_T$ that is different (e.g., longer) than the peak wavelength $\lambda_P$. For example, OM3 and OM4 fibers are typically used or operated at about $\lambda$=850 nm, which is why the EMB requirement is only measured at this wavelength. If the peak bandwidth $BW_P$ does not occur at this wavelength—for example, it falls at 800 nm—then the bandwidth BW at 850 nm can be relatively low and may even fall below the required reference bandwidth $BW_R$ at 850 nm.

For OM3 fibers, the bandwidth requirement is $BW_{RS}$ or EMB>2000 MHz·km at a wavelength $\lambda_S$ of 850 nm, which may or may not be the peak wavelength. For OM4 fibers, the (short-wavelength) bandwidth requirement is $BW_{RS}$ or EMB>4700 MHz·km at a wavelength $\lambda_S$ of 850 nm. Some MMFs can have a peak bandwidth $BW_P$ above 10 GHz·km or even above 15 GHz·km at their peak wavelength $\lambda_P$. Such fibers can have thus have peak wavelength $\lambda_P$ different from 850 nm while still meeting the OM4 bandwidth requirement at $\lambda_S$=850 nm.

Figure 2:
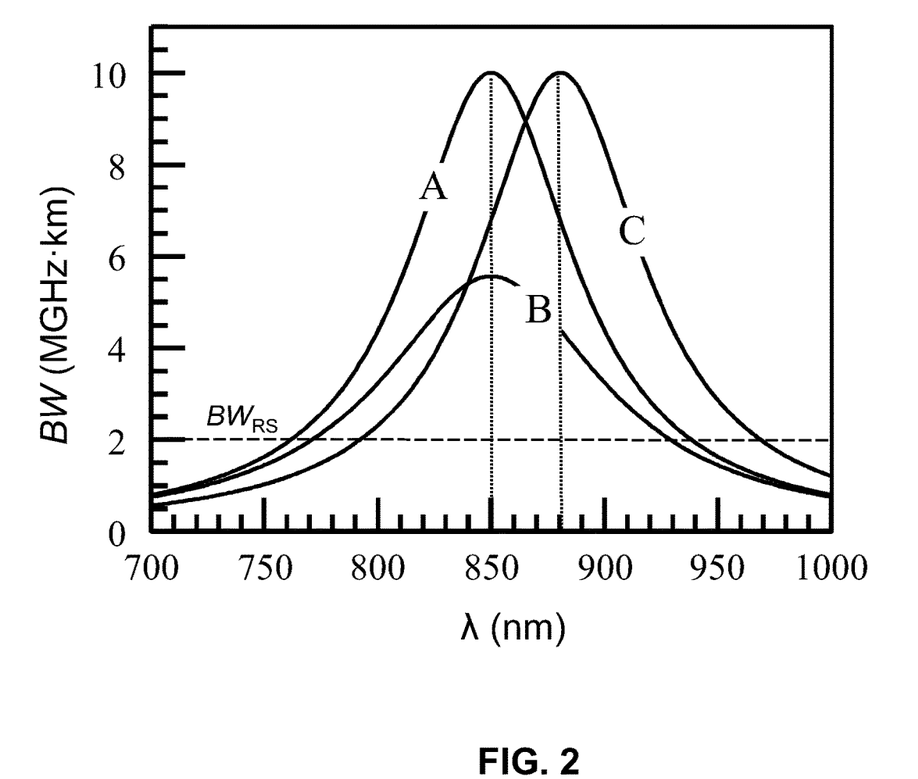
FIG. 2 is a plot of modal bandwidth BW (GHz·km) vs. wavelength λ (nm) for three example fibers A, B and C, and showing the fitted curves based on the bandwidth curve-fitting equation as introduced and discussed below.

FIG. 2 is a plot similar to FIG. 1 and illustrates an example of this situation for three example fibers A, B and C. In all three example fibers A, B and C, the exponent n in Eq. (1) is set to n=1 and the parameter c=1.03×10$^{-5}$. The parameter a is related to the peak bandwidth so that peak bandwidth $BW_P$=0.2/a, as noted above. In FIG. 2, a minimum required bandwidth (i.e., a short-wavelength bandwidth requirement) $BW_{RS}$ of 2000 MHz·km (i.e., 2 GHz·km) at $\lambda_S$=850 nm is shown by a horizontal dashed line. The vertical dotted lines show the peak wavelengths $\lambda_P$ for each example fiber.

With continuing reference to FIG. 2, fiber A has a high peak bandwidth $BW_P$ of 10 GHz·km at a peak wavelength $\lambda_P$ of 850 nm, so that fiber A exceeds the minimum required bandwidth $BW_{RS}$ of 2 GHz·km at $\lambda_S$ by a wide margin. Fiber B also has a peak wavelength $\lambda_P$ of 850 nm but has a much lower peak bandwidth $BW_P$ of 5.6 GHz·km. Yet, fiber B still exceeds the minimum bandwidth requirement $BW_{RS}$ at 850 nm. Note that for wavelengths longer than 850 nm, fiber A always has higher bandwidth than fiber B although the difference decreases as the wavelength increases. This reflects a general property that, for two fibers with the same peak wavelength $\lambda_P$ and different peak bandwidths $BW_{P1}$ and $BW_{P2}$ wherein $BW_{P1} > BW_{P2}$, the higher bandwidth $BW_1$ will remain higher that $BW_2$ over the wavelength range while the difference in bandwidth $BW_1 - BW_2$ decreases farther away from the peak wavelength, until it becomes negligible.

The fiber C has a peak wavelength $\lambda_P$ of 880 nm. The fiber C also has same value for the peak bandwidth $BW_P$ as fiber A, and exceeds the minimum bandwidth requirement $BW_{RS}$ of 2 GHz·km at $\lambda_S = 850$ nm, which is the peak wavelength of fiber A. Note that fiber C's bandwidth BW at 850 nm is less than fiber A's bandwidth at 850 nm. Not also that at a longer target wavelengths $\lambda_T$ such as 950 nm, the bandwidth BW of fiber C is significantly higher than that of fiber A.

Thus, to achieve a desired high target-wavelength bandwidth $BW_T$ at a relatively long target wavelength such as $\lambda_T = 950$ nm, one can try to make or identify fibers having a relatively high peak bandwidth $BW_P$ at a peak wavelength $\lambda_P$ that is greater than 850 nm while still meeting the bandwidth requirement $BW_{RS}$ at the shorter wavelength, e.g., at $\lambda_S = 850$ nm.

Correlations for Bandwidth BW Versus Peak Wavelength and Versus OFL-BW

Figure 3:
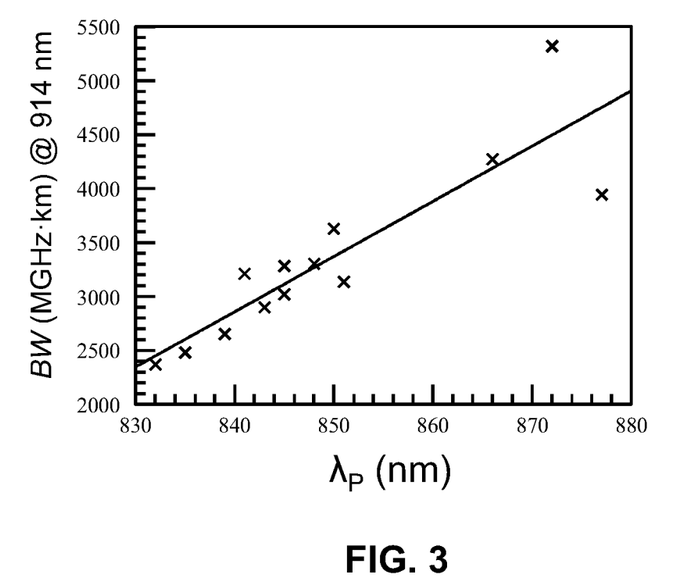
FIG. 3 is a plot of the measured modal bandwidth BW (MHz·km) at 914 nm ("BW @914 nm") versus the peak wavelength $\lambda_P$ (nm) for a set of OM4 fibers, and includes a best-fit line to the data that shows how the 914 nm bandwidth increases with increasing peak wavelength.
Figure 4:
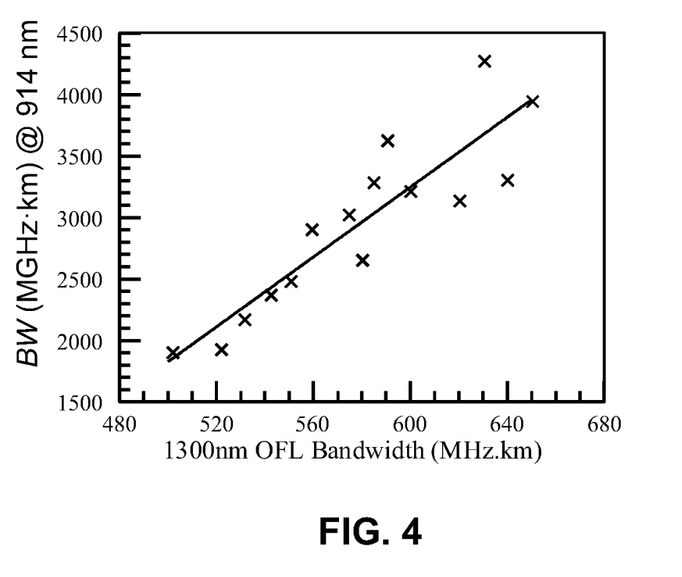
FIG. 4 is a plot of the measured modal bandwidth BW @914 nm versus the 1300 nm OFL bandwidth (MHz·km) for the same set of OM4 fibers of FIG. 3, and includes a best-fit line to the data that shows how the 914 nm bandwidth increases with increasing 1300 nm OFL-BW.

FIG. 3 is a plot of the modal bandwidth BW (MHz·km) at a target wavelength $\lambda_T = 914$ nm versus the peak wavelength $\lambda_P$ (nm) for a set of OM4 fibers. FIG. 4 is a plot of the modal bandwidth BW at 914 nm versus the 1300 nm OFL bandwidth (MHz·km) for the same set of OM4 fibers of FIG. 3.

The plot of FIG. 3 shows, with very good correlation, that the closer the peak wavelength $\lambda_P$ is to 914 nm, the higher the modal bandwidth is at 914 nm. The best-fit line to the data has the form $y = (51.2)x - 40129$ with a correlation coefficient of 0.89. The plot of FIG. 4 also shows, with very good correlation, that fibers having a higher 1300 nm OFL-BW also have a higher modal bandwidth at 914 nm. The best-fit line to the data has the form $y = (14.2)x - 5278$, with a correlation coefficient of 0.89

Thus, the plot of FIG. 3 shows that fibers that have a higher peak wavelength $\lambda_P$ generally have a higher target-wavelength bandwidth $BW_T$ at target wavelength $\lambda_T > \lambda_P$. Also, the plot of FIG. 4 shows that fibers having a higher 1300 nm OFL-BW will also generally have a higher target-wavelength bandwidth $BW_T$ at the target wavelength $\lambda_T$.

Fiber Selecting Methods

An aspect of the method disclosed herein directed to selecting, from a group or set of like MMFs (e.g., fibers belonging to a select OM-standard), those MMFs that meet first and second bandwidth requirements at first and second wavelengths, respectively. In particular, the first bandwidth requirement is a short-wavelength bandwidth requirement $BW_{RS}$ at a short wavelength $\lambda_S$, such as the OM-standard wavelength of 850 nm while the second bandwidth requirement is a target-wavelength requirement $BW_{RT}$ at a target wavelength $\lambda_T$.

The selecting methods include calculating a target-wavelength bandwidth $BW_T$ at a longer target wavelength $\lambda_T$, such as 914 nm or 950 nm, for each of the fibers in the set of fibers, based on existing fiber data. That is to say, the target-wavelength bandwidth $BW_T$ is not measured for each fiber in the set of fibers but instead is determined from existing fiber data at a wavelength that is different from the target wavelength $\lambda_T$.

Once the target-wavelength bandwidth $BW_T$ is calculated, then the next step includes and identifying or selecting those fibers in the set for which the calculated target-wavelength bandwidth $BW_T$ is either: a) equal to or greater than the target-wavelength bandwidth requirement $BW_{RT}$ (i.e., $BW_{RT} \leq BW_T$); or b) favorably compares to the target-wavelength bandwidth requirement $BW_{RT}$ (e.g., $(0.85) \cdot BW_{RT} \leq BW_T$).

The fibers that meet the two different bandwidth requirements $BW_{RS}$ and $BW_{RT}$ at the two different wavelengths $\lambda_T$ and $\lambda_S$ under the conditions noted above can then be selected from the set of fibers for use in applications where adequate performance at the two different wavelengths is called for.

Note that $\lambda_S$ can be 850 nm, and the bandwidth requirement $BW_{RS}$ can be the OM4 bandwidth requirement of $BW_{RS} > 4700$ MHz·km, or in another embodiment, it could be another bandwidth value, e.g., $BW_{RS} > 3800$ MHz·km, or $BW_{RS} > 4300$ MHz·km. In another example, the short-wavelength bandwidth requirement $BW_{RS}$ can be in a range, e.g., $3500$ MHz·km $< BW_{RS} < 4700$ MHz·km, such as for meeting VCSEL based transmission requirements at 25 Gb/s over 100 m.

In an example, the target wavelength $\lambda_T$ can be for example between 870 nm and 1350 nm or between 870 nm and 1060 nm or between 870 nm and 890 nm. In some embodiments, there can be more than one target wavelength $\lambda_T$, e.g., multiple wavelengths within a wavelength range, e.g., between 900 nm and 1000 nm or between 1000 nm and 1100 nm.

A target wavelength $\lambda_T$ of particular interest is related to the Wide Band (WB) MMF standard being drafted in the TIA standard body that generates the OM-standards and which is presently specifying WB MMF to operate between 840 nm and 950 nm. In an example, the short wavelength $\lambda_S$ is in the range from 800 nm to 900 nm, with $\lambda_S < \lambda_T$ as noted above.

In an example, the bandwidth requirements may include a target-wavelength bandwidth requirement $BW_{RT}$ at a target wavelength of $\lambda_T = 950$ nm and a short bandwidth requirement $BW_{RS}$ of between 3500 MHz·km and 4700 MHz·km at a short wavelength $\lambda_S$ of 850 nm or 840 nm. In another example, the short-wavelength bandwidth requirement $BW_{RS}$ at 850 nm or 840 nm can be between 2000 MHz·km and 3000 MHz·km or between 2500 MHz·km and 2700 MHz·km. The methods disclosed herein can be applied to other bandwidth ranges as well. For ease of discussion, in some of the examples below the short-wavelength bandwidth requirement $BW_{RS}$ is that for OM4 fiber, namely EMB>4700 MHz·km at $\lambda_S = 850$ nm.

In an example, the selected fibers have calculated bandwidths $BW_T$ at the longer target wavelength $\lambda_T$ that are substantially the same as the target-wavelength bandwidth requirement $BW_{RT}$, e.g., $(0.85) \cdot BW_{RT} \leq BW_T$ or $(0.9) \cdot BW_{RT} \leq BW_T$ or $(0.95) \cdot BW_{RT} \leq BW_T$. The bandwidths of these selected fibers are then measured at the target wavelength $\lambda_T$, and if the measured target-wavelength bandwidth $BW_M$ is greater or equal to $BW_T$, these fibers are classified as WB MMF.

Three Main Method Steps

An example method of selecting fibers for long-wavelength bandwidth measurement has three main steps.

Step 1: Gather measurement data made on fibers that make up the set of fibers. In an example, this includes for each fiber: i) the DMD measured at the short wavelength $\lambda_S$, ii) the short-wavelength bandwidth $BW_S$, which is typically either the MinEMBc or the EMB, and iii) the OFL-BW measured at the short wavelength $\lambda_S$ or a different wavelength $\lambda_2$.

In an example, the short-wavelength $\lambda_S$ is 850 nm. In one example, the target-wavelength bandwidth $BW_T$ is not measured directly, but is instead derived from the DMD measurement at the short wavelength $\lambda_S$. Also in an example, the OFL-BW measurement is made at a wavelength different than that for the short-wavelength bandwidth $BW_S$, e.g., such as $\lambda_2=1300$ nm.

Step 2. Determine the peak wavelength $\lambda_P$ for each fiber. In an example, this can be done using one of three methods.

(a) A first method is by using the DMD measurement data and in particular from a curvature of the DMD data as is known in the art. An advantage of this first method is that it relies on existing measurement data and thus does not require additional measurements of the fibers.

(b) A second method includes performing bandwidth measurements at multiple wavelengths A and then using Eq. (1) above to fit the bandwidth versus wavelength $\lambda$ data to identify the peak wavelength $\lambda_P$ and peak bandwidth $BW_P$ for each fiber.

(c) A third method involves making measurements of each fiber by using a compensating jumper fiber selected to shift the peak wavelength of the concatenated fibers within a measurement window. This third method can be performed in conjunction with the second method of measuring the bandwidth at multiple wavelengths. An example of this third method is described in greater detail below.

Step 3. Utilize the data gathered in step 1 and the peak wavelength information determined in step 2 to predict (e.g., calculate) the target-wavelength bandwidth $BW_T$ at the longer target wavelength $\lambda_T$.

It is noted that the main steps set forth above include the use of the peak wavelength $\lambda_P$ for the fibers. While every MMF manufacturer typically measures and provides 850 nm bandwidth data, DMD data and 1300 nm OFL-BW data for each fiber, these data alone are not sufficient to determine the performance of a MMF at a target wavelength $\lambda_T$ different from the peak wavelength $\lambda_P$. The peak wavelength information provides the missing link and enables predicting the performance of the fibers at a longer target wavelength $\lambda_T$. This in turn allows for a selection or screening process that identifies those fibers in a group or set of like fibers that can meet (or have a high likelihood of meeting) a target-wavelength bandwidth requirement $BW_{RT}$ at the target wavelength $\lambda_T$.

EXAMPLE 1

As noted above, step 3 involves establishing which fibers from a set of like fibers meet a target-wavelength bandwidth requirement $BW_{RT}$ at a target wavelength $\lambda_T$ (as well as a short-wavelength bandwidth requirement $BW_{RS}$) based on the information obtained from the previous step.

In this example, we attempt to identify a subset of OM4 fibers from a set of OM4 fibers that can meet a target-wavelength bandwidth requirement $BW_{RT} \geq 2550$ MHz·km at a target wavelength $\lambda_T=950$ nm by establishing a threshold (minimum) value $\lambda_{PT}$ for the peak wavelength $\lambda_P$ that indicates which fibers meet both the short-wavelength bandwidth requirement $BW_{RS}$ at $\lambda_S=850$ nm and the target-wavelength bandwidth requirement $BW_{RT}$.

To this end, OM4 fibers were identified that have a peak wavelength $\lambda_P > 870$ nm. The fibers were subsequently measured to determine their target-wavelength bandwidth $BW_T$ at $\lambda_T=950$ nm using a DMD bench at 950 nm and to assess whether the measured target-wavelength bandwidth $BW_T$ met or exceeded the above-identified target-wavelength bandwidth requirement $BW_{RT}$, i.e., whether $BW_T \geq 2550$ MHz·km at 950 nm.

It was found that when the peak wavelength threshold $\lambda_{PT}$ was set to $\lambda_{PT} \geq 876$ nm, and the short-wavelength bandwidth requirement $BW_{RS}$ at 850 nm was set to $BW_{RS} \geq 4750$ MHz·km, the subset of fibers that met these peak-wavelength and short-bandwidth requirements included 11 fibers that met both bandwidth requirements and 12 fibers that did not meet both bandwidth requirements. Thus, the peak wavelength threshold and short-wavelength bandwidth requirements selected resulted in a 48% chance of being correct in selecting the desired fibers.

The peak wavelength threshold was then increased to $\lambda_{PT} \geq 882$ nm and the short-wavelength bandwidth requirement (EMB at 850 nm) maintained at $BW_{RS} \geq 4750$ MHz·km. In this case, the subset of fibers that met these peak-wavelength and short-bandwidth requirements included only 6 fibers, but all 6 fibers met both bandwidth requirements. On the other hand, some fibers that both bandwidth requirements were excluded. Thus, the peak wavelength threshold and short-wavelength bandwidth requirements selected resulted in a 100% chance of being correct in selecting the desired fibers. This higher success rate of selecting "pass" WB MMF is at the expense of missing some fibers that would actually pass. But this is not necessarily a problem since it may be more important in many cases to be sure that those fibers selected for the subset actually satisfy the criteria for being in the subset.

Thus, in one example, method can be carried out in a manner that does not necessarily provide 100% certainty of picking only fibers that pass the selection criteria. However, the method reduces the amount of effort needed to identify a subset of fibers that can be used at the target wavelength $\lambda_T$. In an example, once a subset of fibers that passes the selection criteria is identified, these fibers can then be measured to confirm their performance properties. Measuring the performance properties of a small subset of fibers (e.g., tens of fibers) is a much easier and far less time consuming task then measuring all fibers in a relatively large set (e.g., many hundreds of or even several thousand of) fibers.

EXAMPLE 2

In the first example of the method described above, the short wavelength $\lambda_S=850$ nm and the target wavelength $\lambda_T=950$ nm. The short-wavelength bandwidth requirement is that the fiber must meet the EMB criterion to be an OM4 fiber, i.e. EMB~$BW_{RS}>4700$ MHz·km.

As mentioned above, the short-wavelength bandwidth $BW_S$ and overfilled launch bandwidth OFL-BW of a fiber are usually characterized by the fiber manufacturer. Thus, in an example of step 1 of the method, this information can be obtained by inspecting the measurement data for the set of fibers. Step 2 is then performed as described above to obtain the peak wavelength information for each fiber in the set using one of the three methods.

Step 3 yields a predicted (calculated) target-wavelength bandwidth $BW_T$ at the target wavelength $\lambda_T$. In this first example, a subset of OM4 fibers having a target-wavelength bandwidth requirement of $BW_{RT} \geq 2550$ MHz·km at $\lambda_T=950$ nm is selected by establishing a threshold (minimum) value $\lambda_{PT}$ for the peak wavelength $\lambda_P$ that indicates which fibers meet the short-wavelength bandwidth requirement $BW_{RS}$ and have a calculated target-wavelength bandwidth $BW_T$ that is greater or equal than 85% of the target-wavelength bandwidth requirement $BW_{RT}$ at $\lambda_T$ (i.e., $0.85\ BW_{RT} \leq BW_T$).

To this end, an experiment as conducted wherein OM4 fibers having a peak wavelength $\lambda_P > 870$ nm were identified based on the information provided by the completion of steps 1 and 2. The fibers were subsequently characterized using a DMD measurement at 950 nm to determine their target-wavelength bandwidths $BW_T$ at 950 nm and to assess whether $BW_T \geq 2550$ MHz·km at $\lambda_T = 950$ nm.

Figure 5:
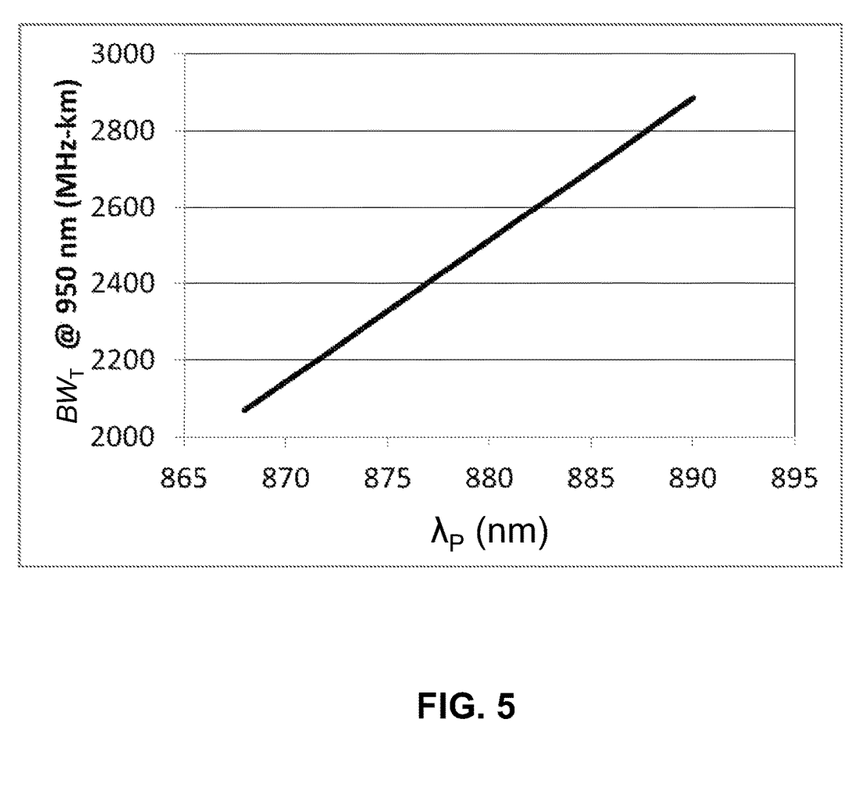
FIG. 5 is a plot of the calculated target-wavelength bandwidth $BW_T$(MHz·km)@950 nm as a function of the peak wavelength $\lambda_P$.

FIG. 5 is a plot of the calculated values of the target bandwidth $BW_T$ at $\lambda_T = 950$ nm as a function of the peak wavelength $\lambda_P$. The best-fit line is represented by the equation $BW_T = 36.976 \cdot (\lambda_P - 812\ nm)$, where $\lambda_P$ is in units of nm and $BW_T$ is in units of MHz·km. This equation yields one method of predicting $BW_T$ as described in step 3, and for $BW_T \geq 2550$ MHz·km at $\lambda_T = 950$ nm corresponds to the relationship $\lambda_P > 881$ nm for $BW_T \geq BW_{RT} = 2550$ MHz·km.

In practice, one could also select fibers that have lower $\lambda_P$ values to account for error bars in the best-fit line to the measurement data. For example, fibers with $\lambda_P$ values greater than 870 nm have calculated target bandwidths $BW_T$ that are 85% of $BW_{RT}$, and fibers with $\lambda_P$ values greater than 874 nm have calculated target-wavelength bandwidths $BW_T$ that are 90% of $BW_{RT}$. These fibers could be selected for bandwidth measurement to determine if they satisfy $BW_T \geq 2550$ MHz·km at 950 nm.

EXAMPLE 3

Example 3 is similar to Example 2, but includes an empirical correction to $\lambda_P$ based on the OFL-BW 1300 that was found to yield better correlation between the measured and predicted values of the target-wavelength bandwidth $BW_T$ at 950 nm. The corrected peak wavelength is denoted $\lambda_{PC}$ and is given by:

$$\lambda_{PC} = 1.019 \cdot [\lambda_P - 0.0533 \ast (833 - OFL_{1300})^{0.985}] \quad (2)$$

where $\lambda_P$ and $\lambda_{PC}$ have units of nm and $OFL_{1300}$ has units of MHz·km. The calculated target bandwidth $BW_T$ in MHz·km is then given by:

$$BW_T = 0.313 \cdot (\lambda_{PC} - 830)^2 - 0.354 \cdot (\lambda_{PC} - 830) + 1616 \quad (3)$$

Figure 6:
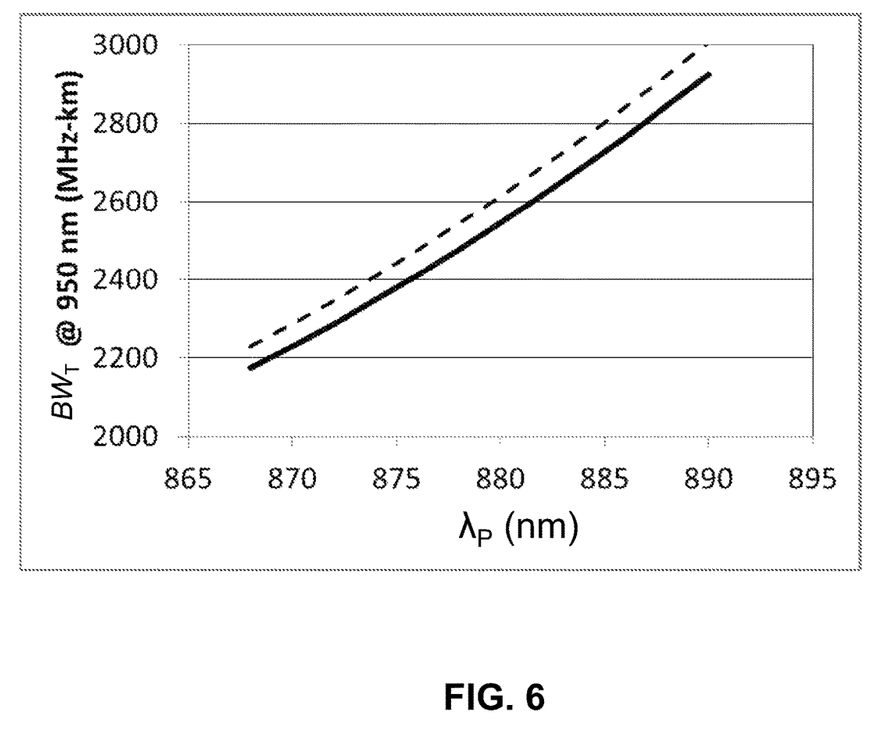
FIG. 6 is a plot of the calculated target-wavelength bandwidth $BW_T$(MHz·km)@950 nm as a function of the peak wavelength $\lambda_P$ when the OFL bandwidths at 1300 nm is equal to 600 nm (solid line) and 640 nm (dashed line)

FIG. 6 is a plot of the calculated EMB values $BW_T$ at $\lambda_T = 950$ nm as a function of the peak wavelength $\lambda_P$ for OFL-BW 1300 values of 600 nm (solid line) and 640 nm (dashed line). The correction factor adds some curvature to the wavelength dependence of $BW_T$ and also shifts the curve slightly higher compared to Example 1.

EXAMPLE 3

As described above, example, Eq. (1) can be used to predict the target-wavelength bandwidth $BW_T$ at a target wavelength $\lambda_T$ at which the target bandwidth has not been measured. As described above in connection with FIG. 1, three or more bandwidth measurements can be used to fit the parameters contained in the bandwidth curve-fitting equation Eq. (1). If more than three bandwidth measurements are available, the parameter n can also be determined, or the other parameters can be determined by means such as the least squares method.

After the parameters a, c and n of Eq. (1) have been determined, the bandwidths at other wavelengths can be calculated. These calculated bandwidths should be considered as estimates. If these estimates have sufficient accuracy, this approach can be used to provide guidance for the fiber selection process before additional bandwidths measurements are made at other wavelengths.

This third example utilizes two values for the bandwidth and a measurement of the peak wavelength $\lambda_P$ at which the fiber has its highest or peak bandwidth $BW_P$. The bandwidth values were the MinEMBc at $\lambda_S = 850$ nm and the overfilled bandwidth at 1300 nm (i.e., OFL-BW 1300). The peak wavelength $\lambda_P$ was determined from the DMD centroid data extracted from the DMD measurement. In theory, the parameter n should be equal to 0.5, although n can be used as an adjustable parameter to provide better prediction at a wavelength of interest, which in this example, is the prediction of the bandwidth $BW_T$ at $\lambda_T = 950$ nm.

The parameter c is first determined using the following equation:

$$c = \frac{\left(\frac{0.2}{OFL1300}\right)^{1/n} - \left(\frac{0.2}{minEMBc850}\right)^{1/n}}{(\lambda p - 1300)^2 - (\lambda p - 850)^2} \quad (4)$$

Then the parameter a is found using the following equation:

$$a = \left(\frac{0.2}{minEMBc850}\right)^{1/n} - C(\lambda p - 850)^2 \quad (5)$$

In some cases, negative values for a may be obtained, in which case a can be set equal to zero or constrained to have a minimum value. For example, using a minimum value of $a = 0.2/(10000)^{1/n}$ would limit the peak bandwidth to 10,000 MHz·km.

Figure 7:
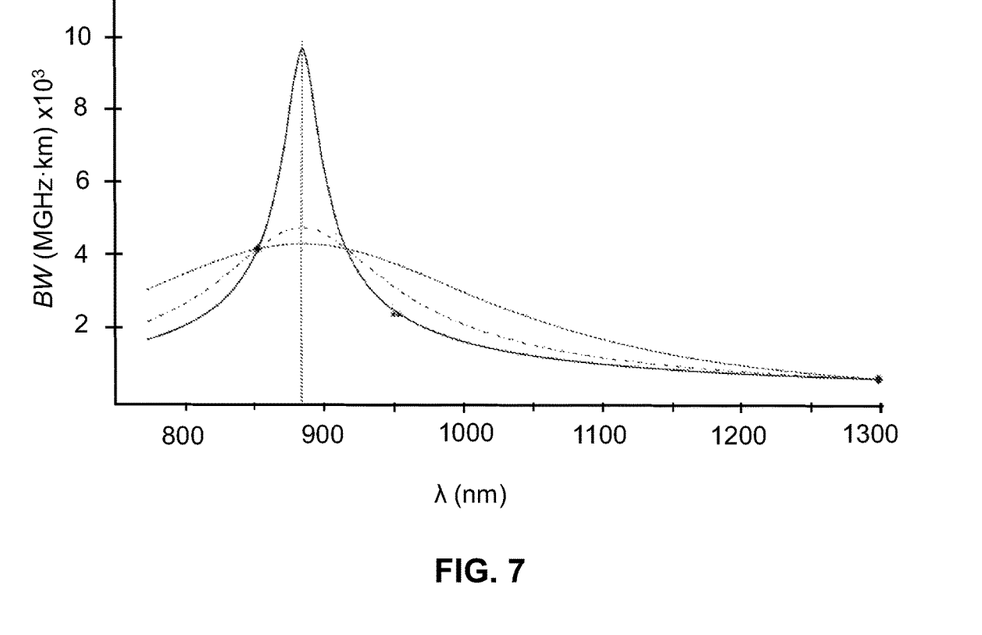
FIG. 7 is a plot of the modal bandwidth BW (MHz·km)× $10^3$ versus wavelength (nm) for an example fiber, wherein the diamonds are the MinEMBc values at λ=850 and the OFL-BW values at λ=1300 nm and the three curves are based using different values of n in the bandwidth curve-fitting equation, as discussed below.

FIG. 7 is a plot of the bandwidth BW (MHz·km)×$10^3$ versus wavelength $\lambda$ (nm) for an example fiber, wherein the diamonds are the bandwidth measurements determined at $\lambda = 850$ (MinEMBc 850) and $\lambda = 1300$ nm (OFL-BW 1300), and the curves are based on the bandwidth curve-fitting equation Eq. (1). The vertical line is at the peak wavelength $\lambda_P$, which was determined from the DMD measurements made on the fiber. In particular, the peak wavelength $\lambda_P$ was determined from the slope of the line fit through the propagation delays plotted versus the square of the distance of the mode group centroids from the center of the fiber, as is known in the art.

The two bandwidth values and the value for the peak wavelength $\lambda_P$ can be used to determine the curve-fitting parameters c and a in the bandwidth curve-fitting equation. This procedure was carried out for the values of n equal to 1.0, 0.5, and 0.365. Then the modal bandwidth equation was used to calculate the bandwidths between 770 and 1300 nm. The dotted curve is for n=1.0, the green curve is for n=0.5, and the dot-dashed curve is for n=0.365.

The goal of this procedure is to calculate the target-wavelength bandwidth $BW_T$ at a target wavelength of $\lambda_T = 950$ nm and compare it to the target-wavelength bandwidth requirement $BW_{RT}$ for long-wavelength applications. The calculated target-wavelength bandwidth $BW_T$ at $\lambda_T = 950$ nm based on the three fitted bandwidth curves are $BW_T = 3839, 3179$, and 2533 MHz·km for the values of n=1.0, 0.5, and 0.365 respectively. The target-wavelength bandwidth $BW_T$ of this fiber was determined from the 950 nm DMD measurement to be $BW_T = 2554$ MHz·km at 950 nm. While theory suggests that n=0.5 should provide the best estimate, it was found that a slight lower value of n provides a better estimate. We have found that an example value of n in the range from 0.3 to 0.4 (e.g., n=0.365) provides a more accurate result with respect to the measured value of the target-wavelength bandwidth $BW_T$.

EXAMPLE 4

Method of Determining the Peak Wavelength of Low-Peak-Wavelength Fibers

Figure 8:
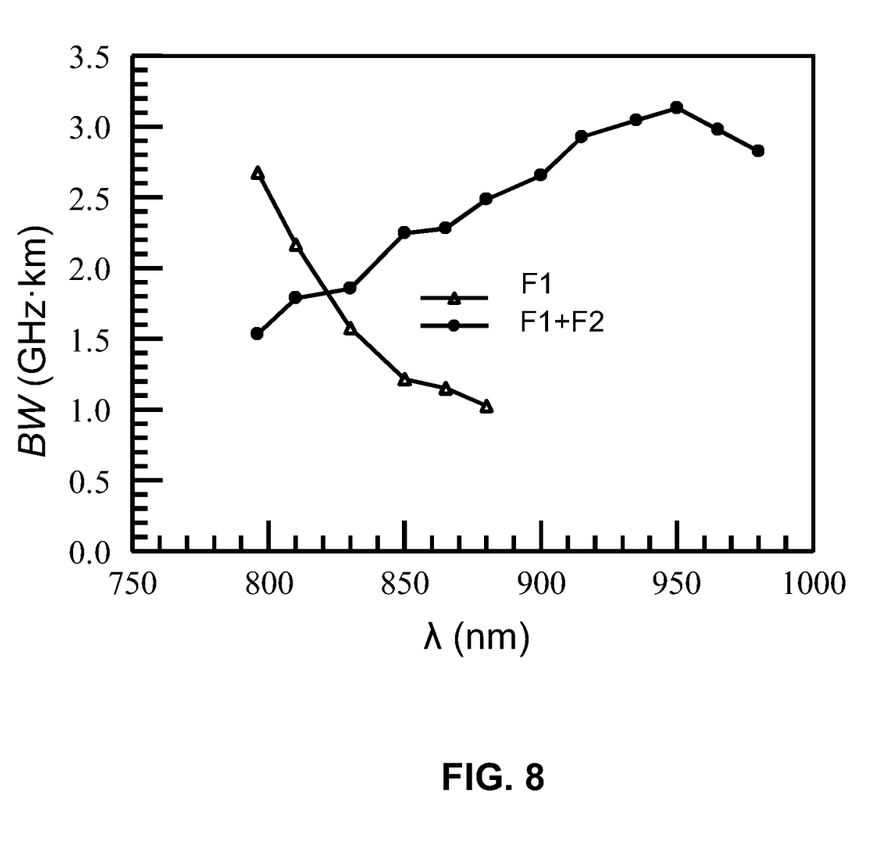
FIG. 8 is a plot of the modal bandwidth BW (GHz·km) versus wavelength λ (nm) and includes measurements (triangles) for a 2.2 km section of an example of MMF with peak wavelength outside of wavelength measurement range, and (dots) for a concatenated link with 225 m of compensation fiber.

Some MMFs can have a peak wavelength $\lambda_P$ that is relatively low and that falls outside of the usual wavelengths of the light source used to measure the peak wavelength. FIG. 8 is a plot of the bandwidth BW (GHz·km) versus wavelength λ (nm) and includes measurements (triangles) for a 2.2 km section of an example low-peak-wavelength MMF Fiber 1, denoted F1 in the legend. The curve for the 2.2 km section shows that the peak wavelength $\lambda_P$ for the fiber section is less than 780 nm, which is the lower limit for the bandwidth measurement.

To measure the peak wavelength $\lambda_P$ of the low-peak-wavelength MMF, the fiber section was cascaded (concatenated) with a section of a Fiber 2 in the form of a modal-dispersion-compensation fiber ("compensating fiber") and denoted F2 in the legend of FIG. 8. The compensating fiber had an alpha value of 1.55 and a length of 225 m. The bandwidth measurements for this concatenated fiber arrangement (F1+F2) are indicated with solid circles and show that a maximum bandwidth $BW_P$=3.1 GHz·km occurs at a wavelength of about $\lambda_P$=950 nm. Thus, the peak wavelength $\lambda_P$ of the concatenated fiber arrangement now falls within the wavelength range of the tunable laser.

The next step in the method involves backing out the peak wavelength $\lambda_P$ of the low-peak-wavelength MMF from the data obtained from the concatenated fiber arrangement. In a concatenated fiber arrangement, a MMF under test with an alpha value of $\alpha_1$ and a length $L_1$ is connected to compensating fiber with an alpha value of $\alpha_2$ and a length $L_2$. The overall alpha value for the concatenated link is the average of the two fiber sections:

$$\alpha = \frac{\alpha_1 L_1 + \alpha_2 L_2}{L_1 + L_2} \quad (6)$$

The values of $\alpha_2$, $L_1$ and $L_2$ are known. The overall alpha value can be determined from the following equation that is obtained from the theoretical $\alpha$ and $\lambda_P$ relationship:

$$\alpha = 1.9703 + \frac{0.0945}{\lambda_P^2} \quad (7)$$

From the measured $\lambda_P$ for the concatenated fiber arrangement F1+F2, we can calculate the overall α value for the link from Equation (7). Then the alpha value for the MMF under test $\alpha_1$ can be calculated from Equation (6):

$$\alpha_1 = \frac{\alpha(L_1 + L_2) - \alpha_2 L_2}{L_1} \quad (8)$$

Once $\alpha_1$ is known, we can calculate the peak wavelength $\lambda_{P1}$ for the MMF under test:

$$\lambda_{P1} = \sqrt{\frac{0.0945}{\alpha_1 - 1.9703}} \quad (9)$$

Figure 9:
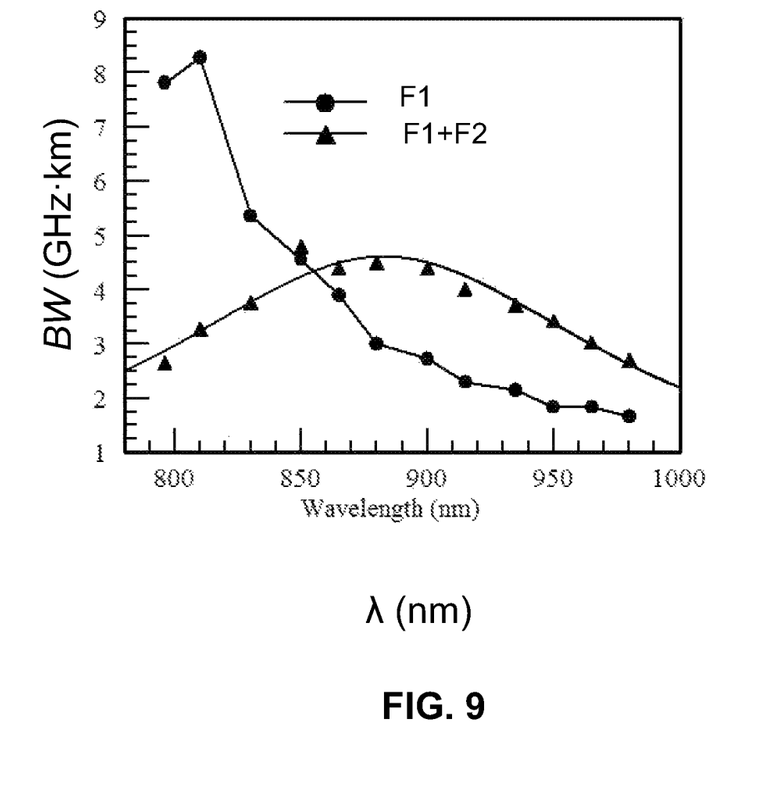
FIG. 9 is a plot of the modal bandwidth (GHz·km) versus wavelength λ (nm) and includes measurements (triangles) for a 2.2 km section of an example low-peak-wavelength MMF, and (dots) for a concatenated link with 100 m of compensation fiber.

To validate the above method, the bandwidth BW versus wavelength λ (nm) was measured for a MMF (Fiber 1) having a length $L_1$=2.2 km and peak wavelength $\lambda_{P1}$ of about 805 nm, which was still in the range of the tunable laser in our measurement system. FIG. 9 is similar to FIG. 8 and shows the measured BW results for Fiber 1, which is denoted F1 in the legend. We then concatenated Fiber 1 with a compensating fiber (Fiber 2=F2) with $\alpha_2$=1.55 and $L_2$=100 m. The measured BW results for the concatenated link F1+F2 are also shown in FIG. 9.

The peak wavelength $\lambda_P$ for the concatenated fiber arrangement in FIG. 9 is about 882 nm using the BW-fitting curve given by Eq. 1. Using Eq. (7), the alpha value α for the concatenated link was calculated to be 2.0917, and from Eq. (8), the alpha value $\alpha_1$ for Fiber 1 was determined to be 2.116. The peak wavelength of Fiber 1 calculated from Eq. (9) is 804 nm, which is only 1 nm different from the direct measurement. This example demonstrates that the concatenation method is a viable approach to determine the peak wavelength $\lambda_P$ of a MMF that is outside of a wavelength measurement range.

Applying the method to the example in FIG. 8, with the peak wavelength $\lambda_P$ outside our wavelength measurement range, the peak wavelength $\lambda_P$ of Fiber 1 as determined from the concatenated link measurement is $\lambda_P$=721 nm.

it will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of determining from a set of like optical fibers which of the optical fibers meet a short-wavelength bandwidth requirement $BW_{RS}$ at a short-wavelength $\lambda_S$ and a target-wavelength bandwidth requirement $BW_{RT}$ at a target wavelength $\lambda_T > \lambda_S$, the method comprising:
   a) obtaining a short-wavelength bandwidth $BW_S$ from differential mode delay (DMD) measurement data at the short wavelength $\lambda_S$;
   b) determining a peak wavelength $\lambda_P$ for each optical fiber;
   c) calculating a target-wavelength bandwidth $BW_T$ at the target wavelength $\lambda_T$ using the determined peak wavelength; and
   d) determining which fibers from the set of fibers satisfy the conditions $BW_{RS} < BW_S$ and $(0.85)BW_{RT} \leq BW_T$.

2. The method according to claim 1, wherein $BW_T \geq (0.9) \cdot BW_{RT}$ at $\lambda_T$=950 nm.

3. The method according to claim 1, wherein $\lambda_S$=850 nm and $\lambda_T$=950 nm.

4. The method according to claim 3, wherein $BW_{RS} \geq 4000$ MHz·km and $BW_{RT} \geq 2550$ MHz·km.

5. The method according to claim 4, wherein $BW_S \geq 4400$ MHz·km at 850 nm.

6. The method according to claim 5, wherein $BW_S \geq 4700$ MHz·km at 850 nm.

7. The method according to claim 1, wherein the peak wavelength is determined using the DMD measurement data.

8. The method according to claim 7, wherein each fiber includes a center, wherein the DMD measurement data includes propagation delays as a function of a square of a distance from the fiber center, and wherein determining the peak wavelength using the DMD measurement data includes measuring a slope of a line fit through the propagation delays as plotted versus the square of the distance from the fiber center.

9. The method according to claim 1, wherein the peak wavelength is determined by using the DMD measurement data and a measurement of an overfilled launch bandwidth.

10. The method according to claim 1, wherein the short wavelength $\lambda_S$ is in the range from 800 nm to 900 nm and the target wavelength $\lambda_T$ is in the range from 880 nm to 900 nm, subject to the condition that $\lambda_T$ is at least 100 nm greater than $\lambda_S$.

11. The method according to claim 1, wherein the determining of the peak wavelength $\lambda_P$ for each fiber in act b) further comprises:
performing bandwidth measurements at multiple wavelengths $\lambda$; and
using a bandwidth curve-fitting equation to fit the bandwidth measurements versus wavelength data to identify the peak wavelength $\lambda_P$ for each fiber.

12. The method according to claim 11, wherein the multiple wavelengths include three or more different wavelengths.

13. The method according to claim 11, wherein the bandwidth curve-fitting equation is defined by:

$$BW(\lambda) = \frac{0.2}{[a + c(\lambda - \lambda_p)^2]^n}$$

where a, c and n are curve-fitting parameters.

14. The method according to claim 13, wherein n is between 0.3 and 0.4.

15. The method according to claim 1, wherein the determining of the peak wavelength for each fiber in part b) further comprises for each fiber:
attaching the fiber to a section of compensating fiber;
measuring a modified peak wavelength of the combination of the fiber and compensating fiber; and
determining from the modified peak wavelength the peak wavelength of the fiber.

16. A method of selecting from a set of optical fibers a subset of optical fibers that meet a short-wavelength bandwidth requirement $BW_{RS}$ at a short-wavelength $\lambda_S$ and a target-wavelength bandwidth requirement $BW_{RT}$ at a target wavelength $\lambda_T > \lambda_S$, the method comprising:

a) obtaining a short-wavelength bandwidth $BW_S$ from DMD measurement data at the short wavelength $\lambda_S$;
b) determining a peak wavelength $\lambda_P$ for each optical fiber;
c) calculating a target-wavelength bandwidth $BW_T$ using the determined peak wavelength;
d) identifying a peak wavelength threshold $\lambda_{PT}$ from the determined peak wavelengths of the optical fibers in the set of optical fibers; and
e) selecting, from the set of optical fibers, those optical fibers that have a peak wavelength $\lambda_P \geq \lambda_{PT}$ and a short-wavelength bandwidth $BW_S \geq BW_{RS}$.

17. The method according to claim 16, wherein the determining of the peak wavelength $\lambda_P$ for each fiber in act b) further comprises:
performing bandwidth measurements for at least three wavelengths $\lambda$; and
using a bandwidth curve-fitting equation to fit the bandwidth measurements versus wavelength data to identify the peak wavelength $\lambda_P$ for each fiber.

18. The method according to claim 17, wherein the bandwidth curve-fitting equation is defined by:

$$BW(\lambda) = \frac{0.2}{[a + c(\lambda - \lambda_p)^2]^n}$$

where a, c and n are curve-fitting parameters.

19. The method according to claim 16, wherein $BW_T \geq (0.9) \cdot BW_{RT}$ at 950 nm.

20. The method according to claim 16, wherein $\lambda_S = 850$ nm and $\lambda_T = 950$ nm, and wherein $BW_{RS} \geq 4000$ MHz·km and $BW_{RT} \geq 2550$ MHz·km.

21. The method according to claim 16, wherein $BW_S \geq 4400$ MHz·km at 850 nm.

22. The method according to claim 21, wherein $BW_S \geq 4700$ MHz·km at 850 nm.

23. The method according to claim 16, wherein the peak wavelength is determined using the DMD measurement data.

24. The method according to claim 23, wherein each fiber includes a center, wherein the DMD measurement data includes propagation delays as a function of a square of a distance from the fiber center, and wherein determining the peak wavelength using the DMD measurement data includes measuring a slope of a line fit through the propagation delays as plotted versus the square of the distance from the fiber center.

* * * * *

UNITED STATES PATENT AND TRADEMARK OFFICE
CERTIFICATE OF CORRECTION

PATENT NO.         : 10,168,246 B2
APPLICATION NO.    : 15/298385
DATED              : January 1, 2019
INVENTOR(S)        : Scott Robertson Bickham et al.

Page 1 of 1

It is certified that error appears in the above-identified patent and that said Letters Patent is hereby corrected as shown below:

In the Claims

In Column 14, Line 54, Claim 1, delete "$BW_{RS}<BW_S$" and insert -- $BW_{RS} \leq BW_S$ --, therefor.

Signed and Sealed this
Twenty-second Day of October, 2019

Andrei Iancu
*Director of the United States Patent and Trademark Office*